(12) United States Patent
Gedge et al.

(10) Patent No.: US 9,787,428 B2
(45) Date of Patent: Oct. 10, 2017

(54) SMART DYNAMIC LINE MANAGEMENT

(71) Applicant: BRITISH TELECOMMUNICATIONS PUBLIC LIMITED COMPANY, London (GB)

(72) Inventors: Richard Gedge, London (GB); Philip M Bull, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/105,750

(22) PCT Filed: Dec. 10, 2014

(86) PCT No.: PCT/GB2014/053656
§ 371 (c)(1),
(2) Date: Jun. 17, 2016

(87) PCT Pub. No.: WO2015/092367
PCT Pub. Date: Jun. 25, 2015

(65) Prior Publication Data
US 2017/0005750 A1 Jan. 5, 2017

(30) Foreign Application Priority Data

Dec. 19, 2013 (EP) .................................. 13250125

(51) Int. Cl.
*H04L 1/00* (2006.01)
*H04B 3/32* (2006.01)
(Continued)

(52) U.S. Cl.
CPC .............. *H04L 1/0015* (2013.01); *H04B 3/32* (2013.01); *H04L 1/0002* (2013.01); *H04L 5/006* (2013.01); *H04M 11/062* (2013.01)

(58) Field of Classification Search
None
See application file for complete search history.

(56) References Cited

U.S. PATENT DOCUMENTS 7,317,754 B1* 1/2008 Remy .................. H04L 1/0002
375/222
2005/0237940 A1 10/2005 Tennyson

FOREIGN PATENT DOCUMENTS

EP 2 237 462 10/2010

OTHER PUBLICATIONS

International Search Report for PCT/GB2014/053656, dated Feb. 24, 2015, 2 pages.

* cited by examiner

*Primary Examiner* — Diane Lo
(74) *Attorney, Agent, or Firm* — Nixon & Vanderhye P.C.

(57) ABSTRACT

The invention describes a method of performing re-synchronizations on a DSL line to optimize the synchronization rate of the line. The line is monitored over a period of time, and a stable SNR margin is determined, below which the line is observed to lose synchronization. Historical synchronization rates and associated SNR margins for the line are recorded, and the highest stable synchronization rate is determined as the historical synchronization rate that does not have any associated SNR margins below the stable SNR margin. The method attempts to optimize the synchronization rate of the line towards this highest stable synchronization rate. To do this, the current target SNR margin imposed by DLM is identified, for example, by interrogating the DLM system or by noting the SNR margin on the line immediately after the most recent synchronizations. Assuming the current synchronization rate on the line is less than the highest stable rate, then the synchronization rate is optimized by triggering a synchronization of the line when the SNR margin is greater (Continued)

than the target SNR margin plus an additional predetermined amount. The result should be an increase in the synchronization rate, and can be repeated until the synchronization rate reaches the highest stable synchronization rate.

6 Claims, 6 Drawing Sheets

(51) Int. Cl.
*H04M 11/06* (2006.01)
*H04L 5/00* (2006.01)

SMART DYNAMIC LINE MANAGEMENT

This application is the U.S. national phase of International Application No. PCT/GB2014/053656 filed 10 Dec. 2014, which designated the U.S. and claims priority to EP Patent Application No. 13250125.5 filed 19 Dec. 2013, the entire contents of each of which are hereby incorporated by reference.

FIELD OF THE INVENTION

This invention relates to a method of dynamic line management of a digital subscriber line in a telecommunications network, in particular a method of synchronising a digital subscriber line in a manner that optimises the resulting synchronisation rate.

BACKGROUND TO THE INVENTION

Digital subscriber line (DSL) technology, often referred to as "broadband", is a family of services that provides high speed digital data transmission over the metallic twisted copper pairs that form part of a local telephone network. DSL is commonly used to provide a customer's home with a network connection, typically to the Internet via an ISP.

Some DSL lines, especially longer rural lines, are susceptible to interference resulting in instability in the connection. A DSL line can lose synchronisation when the noise on the line is so large that the data (signal) being transmitted cannot be processed correctly. Line management techniques can help address this problem and stabilise a line at the expense of a lower synchronisation rate. One such technique is known as Dynamic Line Management DLM.

DLM measures the line parameters, such as the error rates and train/resynchronisation events, and adjusts line configuration parameters accordingly to try and stabilise the line, which has the effect of reducing the synchronisation rate. DLM applies one of a limited number of profiles to the line to improve the stability. This is typically achieved by setting a target signal to noise ratio margin, or target SNR margin, which affects the maximum rate the line can synchronise at. A high target SNR margin will result in a more stable line, and a low target SNR margin a less stable line (all other factors being equal). The effect is more pronounced on problematic or longer lines.

The profiles applied by DLM are limited in the sense that only a small number of relatively coarse target SNR margins are used. An example of the range of target SNR margins typically used might be 3 dB, 6 dB, 9 dB, 12 dB and 15 dB. These coarse steps in target SNR margin can result in relatively large changes in the resulting synchronisation rate. Thus, for longer lines in particular where the synchronisation rate is usually quite low, relatively large changes in synchronisation rate are not desirable and can result in an overly large reduction in the synchronisation rate.

European patent application EP2237462 describes a method for dynamic line management, where the signal to noise ratio is compared to a threshold, and resynchronisations are forced on the line accordingly.

US patent application US2005/0237940 describes a system for adaptively applying a target noise margin to a DSL line. In the approach described, the target noise margin is increased for the line until it runs error free from the influence of impulse noise.

SUMMARY OF THE INVENTION

According to one aspect of the present invention, there is provided a method of managing a digital subscriber line in a network, comprising:

a) determining a minimum SNR margin, wherein the minimum SNR margin is the SNR margin of the digital subscriber line below which the digital subscriber line loses synchronisation;

b) monitoring the synchronisation rate and respective SNR margin following each of a plurality of synchronisations on the digital subscriber line, and establishing an optimum synchronisation rate as the synchronisation rate where all the respective SNR margin or margins are greater than the minimum SNR margin;

c) monitoring the SNR margin and synchronisation rate of the digital subscriber line; and
  i. initiating synchronisation of the digital subscriber line when both the SNR margin is a predetermined amount over a target SNR margin for the digital subscriber line, and the synchronisation rate is less than the optimum synchronisation rate;
  ii. repeating the initiating step until the synchronisation rate after synchronisation reaches the optimum synchronisation rate.

The invention can be used in conjunction with an existing DLM arrangement active on the line, with the method fine tuning a stable, but slower than optimal, synchronisation rate towards a higher optimal synchronisation rate. The method can also be applied to non DLM lines, where line management is handled in some other way.

DLM by itself would take a long time to increase the synchronisation rate, as line resynchronisations are not triggered very frequently when a line does not experience many errors. Left alone, DLM might never reach the optimum rate identified by this invention, but even if it did, it would only have done so by chance and take a lot longer to get there.

The target SNR margin can be obtained from the network, for example by interrogating the DLM system. Alternatively, the target SNR margin can be determined by analysis of the SNR margin of the digital subscriber line over a period of time, and identifying the target SNR margin as the SNR margin of the digital subscriber line immediately after a successful resynchronisation.

The minimum SNR margin is the SNR margin of the digital subscriber line just before a resynchronisation of the digital subscriber line.

The digital subscriber line typically connects a digital subscriber line access multiplexer and a customer premises equipment, or modem, and the synchronisation rates are downstream synchronisation rates from the digital subscriber line access multiplexer to the customer premises equipment. However, the invention could also be applied to upstream rates by analysis of the upstream parameters and margins instead of the downstream.

According to a further aspect of the present invention, there is provided a line optimisation unit for managing a digital subscriber line in a network, adapted in use to:

a) determine a minimum SNR margin, wherein the minimum SNR margin is the SNR margin of the digital subscriber line below which the digital subscriber line loses synchronisation;

b) monitor the synchronisation rate and respective SNR margin following each of a plurality of synchronisations on the digital subscriber line, and estimate an optimum synchronisation rate as the synchronisation rate where all the respective SNR margin or margins are greater than the minimum SNR margin;

c) monitor the SNR margin and synchronisation rate of the digital subscriber line; and
  i. initiate synchronisation of the digital subscriber line when both the SNR margin is a predetermined amount over a target SNR margin for the digital subscriber line, and the synchronisation rate is less than the optimum synchronisation rate;

ii. repeat the initiation step until the synchronisation rate after synchronisation reaches the optimum synchronisation rate.

The line optimisation unit can reside in the telephones exchange, connected to the DSLAM.

Alternatively, the line optimisation unit can reside and be connected to the customer premises equipment.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

The invention relates to a method of performing re-synchronisations on a DSL line to optimise the synchronisation rate of the line. The line is monitored over a period of time, and a stable SNR margin is determined, below which the line is observed to lose synchronisation. Historical synchronisation rates and associated SNR margins for the line are recorded, and the highest stable synchronisation rate is determined as the historical synchronisation rate that does not have any associated SNR margins below the stable SNR margin. The method attempts to optimise the synchronisation rate of the line towards this highest stable synchronisation rate. To do this, the current target SNR margin imposed by DLM is identified, for example, by interrogating the DLM system or by noting the SNR margin on the line immediately after the most recent synchronisations. Assuming the current synchronisation rate on the line is less than the highest stable rate, then the synchronisation rate is optimised by triggering a synchronisation of the line when the SNR margin is greater than the target SNR margin plus an additional predetermined amount. The result should be an increase in the synchronisation rate, and can be repeated until the synchronisation rate reaches the highest stable synchronisation rate.

Figure 1:
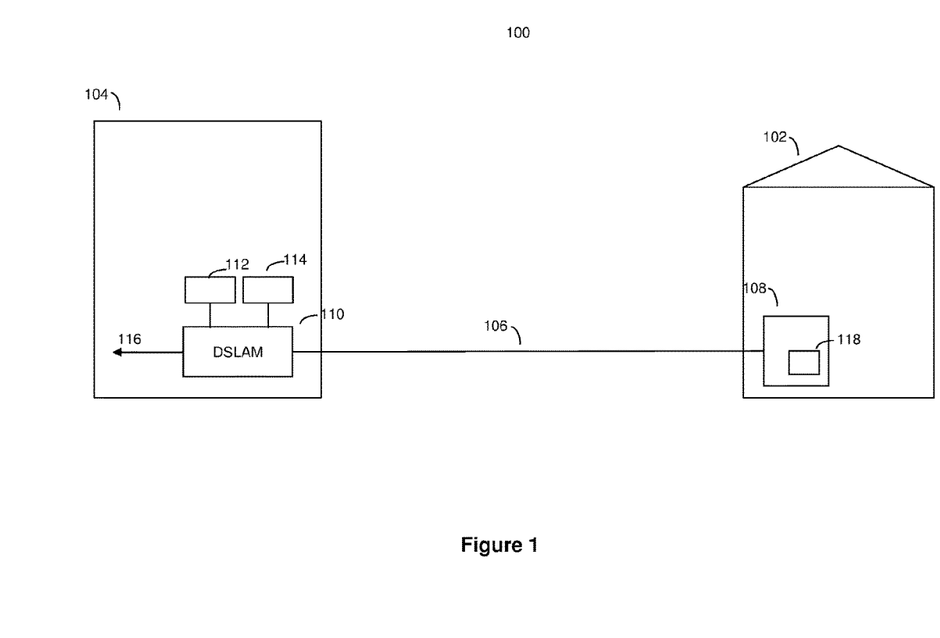
FIG. 1 is a system diagram showing a telephone exchange and a DSL line running to a customer premises.

FIG. 1 illustrates a telecommunications network 100 including a customer's premises 102. The customer's premises 102 is connected to a telephone exchange 104 via a telephone line 106. The telephone line 106 is a twisted copper or aluminium pair of wires. Within the customer premises 102, there is a customer premises equipment CPE 108, such as a router or home hub, to which the line 106 is connected. At the exchange 104, the line 106 is connected to a digital subscriber line access multiplexer, DSLAM, 110.

The DSLAM 110 is a network element that provides digital subscriber line (DSL) services to connected lines and associated customer premises. The line 106 is thus also referred to as digital subscriber line, or DSL line. At the exchange 104 is also a line optimising unit 114 connected to the DSLAM 110. Connected to the DSLAM 110 is a rate adaptive management module 112, which provides dynamic line management DLM for lines connected to the DSLAM 110. The rate adaptive management module 112 measures the performance of connected lines, which are used by DLM to determine the stability of a line, and adjust line configuration parameters accordingly. One parameter that is adjusted is the target signal to noise ratio margin, or target SNR margin. The target SNR margin is taken in account when a line synchronises and affects the stability and synchronisation rate of the line.

The DSLAM is also connected to a line optimising unit 114, which comprises a processor and a data store, such as hard disk array or similar. The line optimising unit 114 gathers various measurements associated with the line from the DSLAM 110 and the CPE 108, stores them in the data store, and the processor uses the stored measurements to determine when to initiate a line synchronisation to improve the synchronisation rate in accordance with an example of the invention. Data can be gathered at regular intervals.

The DSLAM 110 also has onward connections 116 to data provisioning networks. A skilled person will also appreciate that there are other elements in the exchange 104, such as elements that provide standard PSTN services to connected lines. However, these have been omitted for simplicity.

The CPE 108 also includes a line optimising unit 118, which is similar to the line optimising unit 114 in the exchange, and also includes a processor and a data store. The line optimising unit 114 gathers various measurements associated with the line 106, stores them in the data store, and the processor uses the stored measurements to determine when to initiate a line synchronisation to improve the synchronisation rate in accordance with an example of the present invention.

Whilst the present example shows a DSLAM 110 residing in the exchange 104, the invention would still be applicable to configurations where the DSLAM is located elsewhere. For example, in a fibre to the cabinet (FTTC) arrangement, the DSLAM 110 would be located in a roadside cabinet, which is typically located nearer the customer premises than the exchange.

In an alternative network arrangement, DSLAM like functionality can be provided by an MSAN (multi services access node), which also provides other capabilities such as voice.

Figure 2:
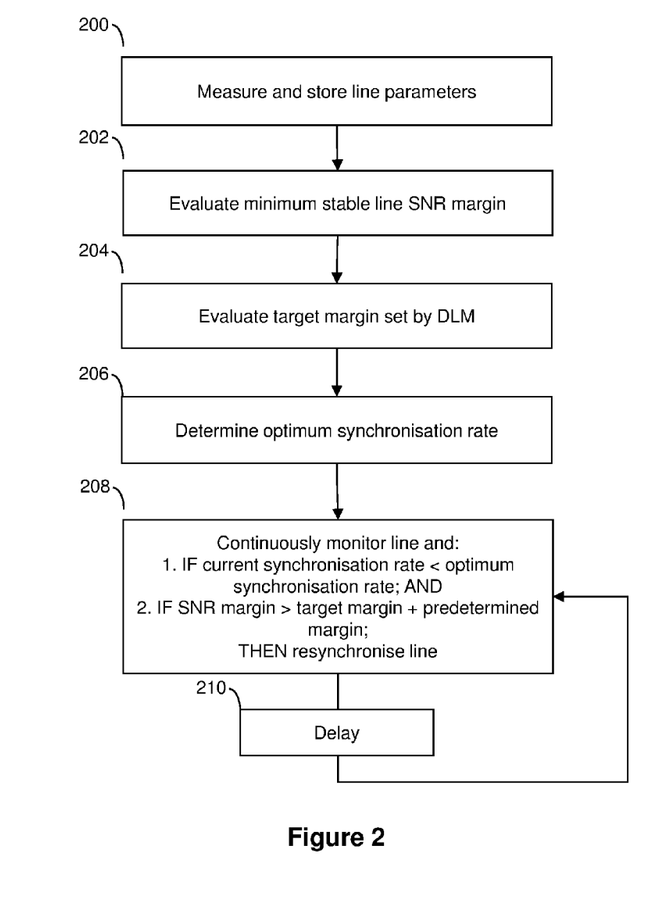
FIG. 2 is a flow chart summarising the steps of an example of the present invention.

An example of the present invention will now be described with reference to the flow chart of FIG. 2.

Processing starts at step 200, where parameters associated with the line 106 are measured and stored by the line optimisation unit 118 over a period of time. Some of the data can be obtained from the modem in the CPE, or from the DSLAM. The parameters include the signal to noise ratio (SNR) margin and the line synchronisation rate.

The SNR margin is the difference between the actual SNR associated with the line and the SNR required to operate at the current line synchronisation rate. The SNR is the ratio of the received wanted DSL signal power to unwanted interference signals or noise on the line. The connection stability of a DSL line is principally determined by the SNR margin associated with the line, with a high SNR margin generally being more stable. Although there is an associated SNR and SNR margin for both the upstream and the downstream transmission bands, it is usually the downstream band that is more critical to service quality. As such, reference to SNR margin and synchronisation rate here will be in relation to the downstream band to optimise the downstream synchronisation rate, though the invention could equally be implemented using the upstream band parameters to optimise the upstream synchronisation rate.

Figure 3:
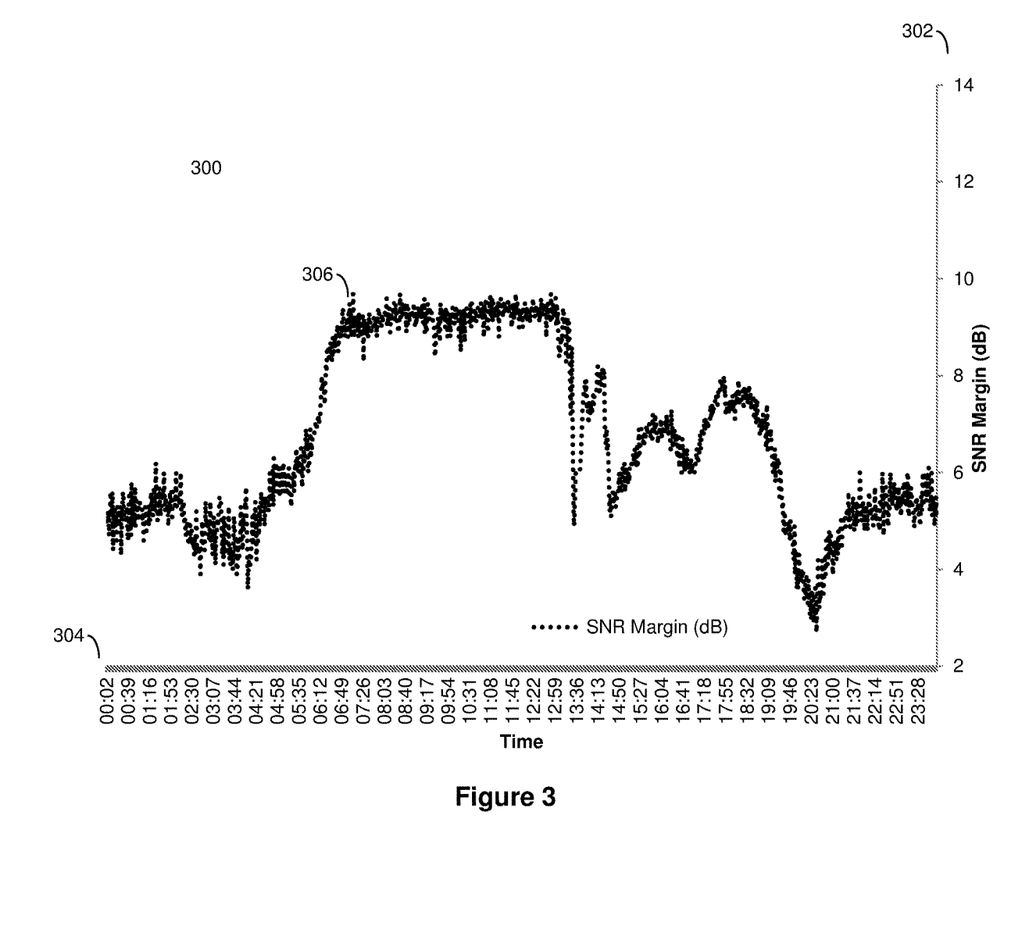
FIG. 3 is a graph illustrating the variation in the SNR margin for an example line over a 24 hour period.

FIG. 3 is a graph 300 illustrating the SNR margin 306 for an example line over a 24 hour period taken from a sample of the data collected for the line. SNR margin is shown on the y-axis 302 and is measured in dB. Time is shown on the x-axis 304, with measurements taken and plotted every minute over the 24 hour period.

The daily variation in the SNR margin is fairly typical for DSL lines, with highs during the day and lows overnight. A low SNR margin is indicative of greater interference experienced on the line. This is at least partially caused by the "diurnal effect", where the interference from medium wave radio stations in greater. Other sources of interference, such as interference from electrical equipment and crosstalk from adjacent DSL lines, can also affect the SNR and SNR margin on the line.

Below a certain level of SNR, the DSL system is unable to distinguish the wanted signal from the noise on the line, so the line will lose synchronisation and the connection will drop. DSL lines are normally set up to automatically attempt to reinitialise and synchronise the line following a drop, resulting in a brief period of loss of service.

Figure 4:
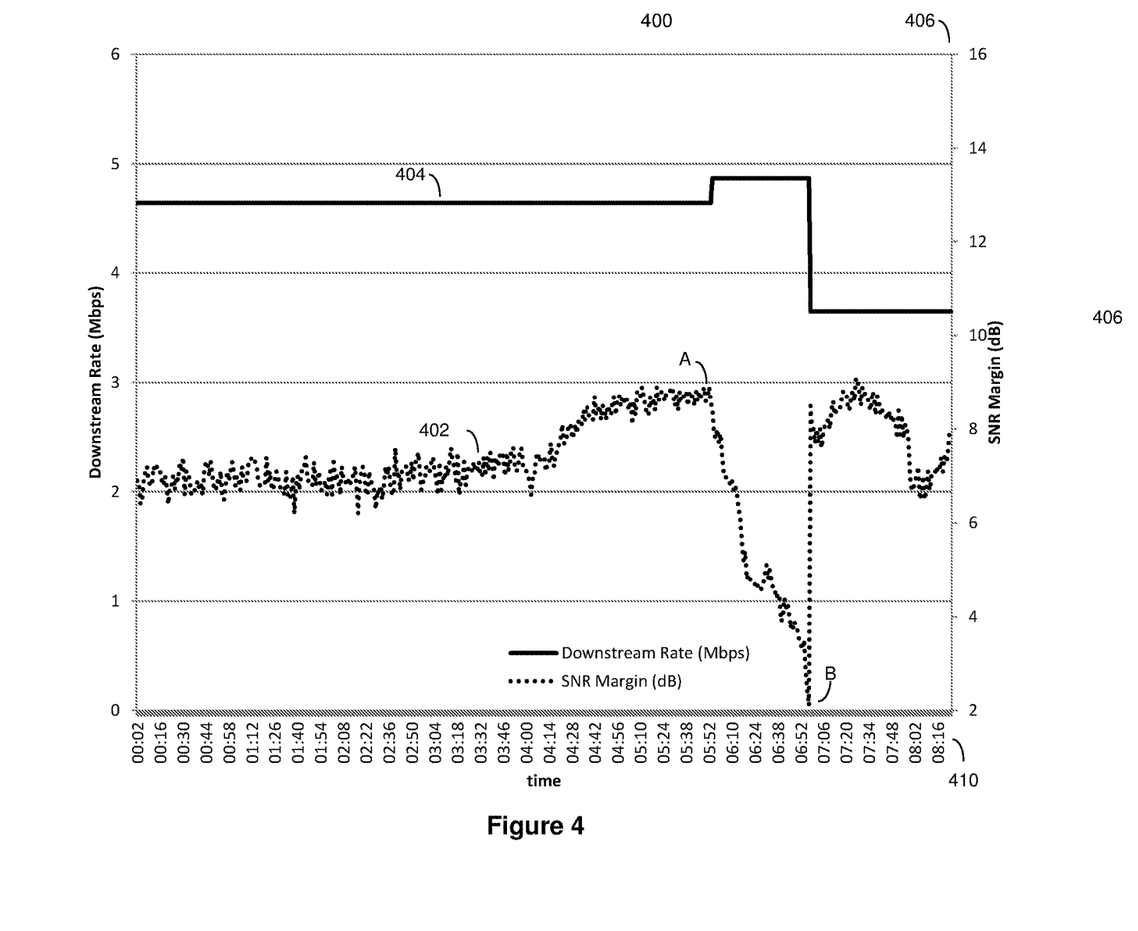
FIG. 4 is a graph illustrating the SNR margin and associated synchronisation rate plotted over a period of time for a DSL line where synchronisation is lost.

FIG. 4 is a graph 400 illustrating the SNR margin 402 and associated synchronisation rate 404 for a line where a reinitialisation has taken place based on a sample of the data collected. The downstream synchronisation rate 404 is shown by the solid line and measured in Mb/s on the left-hand y-axis 408. The SNR margin 402 is shown by the dotted plot measured in dB on the right-hand y-axis 406. Both plots are generated from measurements taken at intervals over a 24 hour period, with time shown on the x-axis 410.

The graph 400 shows the SNR margin 402 being largely stable until the time reaches about 5:50 at point A, where the SNR margin is just under 9 dB. After point A, the SNR margin falls to between 2 and 3 dB just before 7:00 at point B. The drop in SNR margin will be as a result of interference experienced on the line. At point B, the noise is so significant and SNR margin so low that the line loses synchronisation and the connection drops. The line immediately attempts to reinitialise, which involves the modem in the CPE 108 communicating with the DSLAM 110 to set up a connection and synchronise the line at a particular synchronisation rate. The synchronisation rate will depend on various factors, including the SNR measured on the line when the line reinitialises and the target SNR margin set by DLM. Bit loading is performed based on these parameters to determine the amount of data that can be carried in each frequency bin, giving rise to a resulting line synchronisation rate.

In FIG. 4, the line has a downstream synchronisation rate of around 4.9 Mb/s between points A and B. At point B, the line loses synchronisation, and the line reinitialises. After reinitialisation, the line resynchronises at a rate of around 3.6 Mb/s. The SNR margin after resynchronisation is around 9 dB.

Whilst FIG. 4 only shows one line reinitialisation, some lines may suffer from numerous and regular reinitialisations depending on how much interference there is and how susceptible the line is to that interference.

The target SNR margin set by DLM aims to stabilise a DSL line, with values increasing in 3 dB increments, starting at 3 dB. The higher the target SNR margin used on a line, the more stable the line, but the trade-off is a reduction in the resulting synchronisation rate. Generally, DLM will adjust the target SNR margin in response to the number of errors and lost synchronisations detected on the line.

Turning back to FIG. 2, in step 202 the line optimisation unit 114 utilises the data collected to evaluate the minimum stable SNR margin associated with the line. The minimum stable SNR margin is defined as the SNR margin below which the line loses synchronisation. In practice, this is not at 0 dB, but at some non-zero value that depends on the DSLAM and modem in CPE, their settings, tolerances and so on. However, this parameter can be determined from experiments as described below.

One way in which to determine this is to examine the data shown in FIG. 4, and specifically, the SNR margin just before the line loses synchronisation at point B. In this example, the SNR margin just before point B is just around 2.1 dB. Therefore, the minimum stable SNR margin is 2.1 dB. However, it is better to look at a number of lost synchronisations, and to take the average of the SNR margin values as the minimum stable SNR margin. In this example, by taking an average from a number of lost synchronisations, the minimum stable SNR margin is found to be 3 dB. The line optimisation unit 118 stores this minimum stable SNR margin. It should be noted that the precise value for the minimum stable SNR margin will depend on the sampling rate of the SNR margin data of the line. Measurements taken more frequently from the line will lead to a more accurate measure of the minimum stable SNR margin.

In step 204, the line optimisation unit 118 evaluates the target margin set by DLM. This can be done by directly interrogating the rate adaptive management module 112 that controls DLM, as the target SNR margin is set by DLM. Alternatively, an empirical approach can be used instead based on the data shown in FIG. 4.

The target SNR margin can be determined empirically, by examining the SNR margin immediately after a successful resynchronisation. In FIG. 4, a successful resynchronisation occurs immediately after point B, with the SNR margin immediately after point B between 8-9 dB. Thus, the target SNR margin can be considered to be equal to this value. However, in most situations, DLM sets target SNR margin by 3 dB increments starting at 3 dB, and thus the determined target SNR margin can be rounded to 9 dB. As for the evaluation of the minimum stable SNR margin in step 202, the target SNR margin can be evaluated by averaging the SNR margin after a number of resynchronisations, and then rounding according to any fixed increments used by DLM, such as to nearest 3 dB. Furthermore, as DLM changes the target SNR margin applied to the line in a dynamic manner, using the most recent line synchronisation might be more appropriate. In this example, the line synchronisation at point B is taken as the most recent synchronisation, and this the target SNR margin is evaluated to be 9 dB by the line optimisation unit 118.

Figure 5:
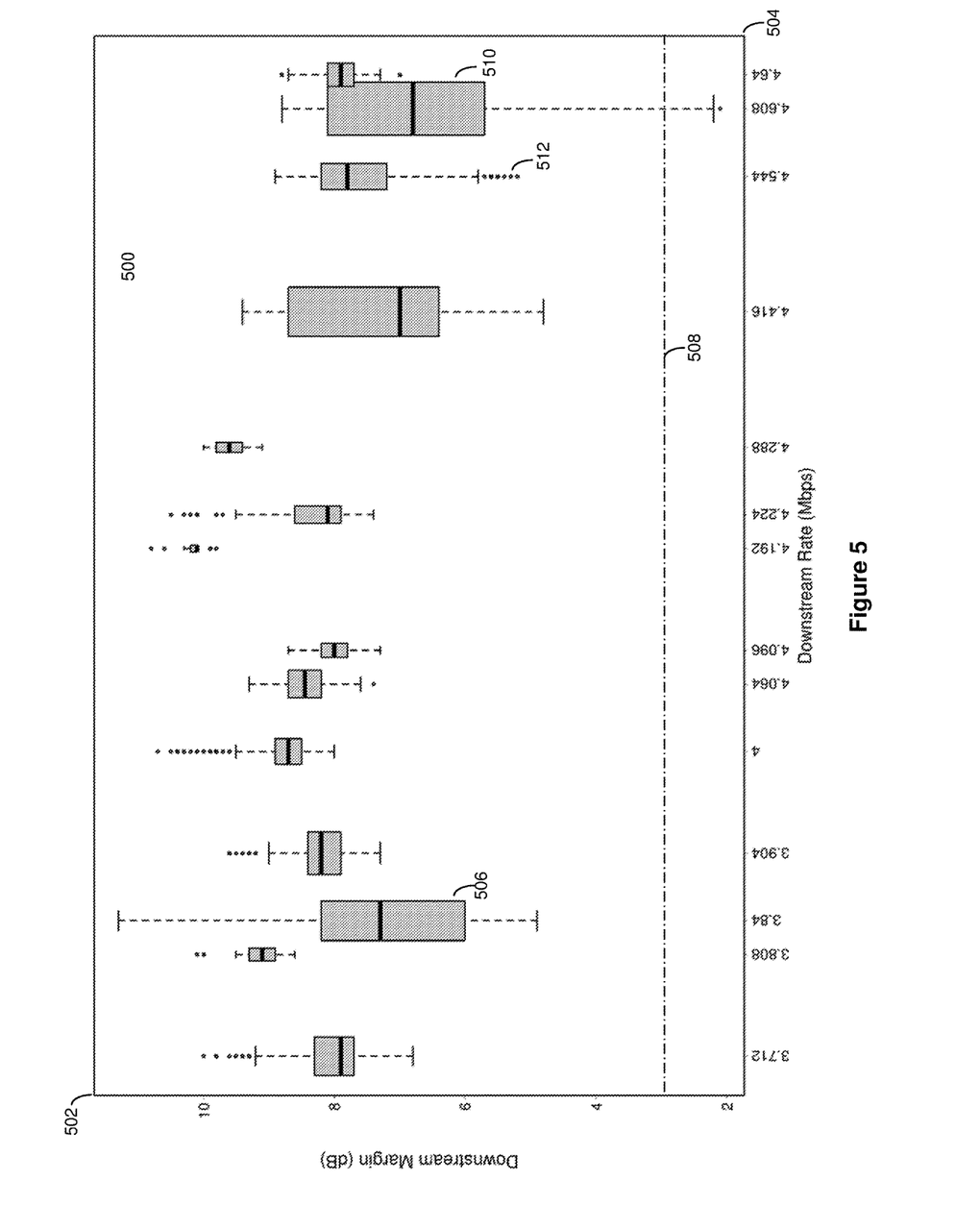
FIG. 5 is a graph plotting SNR margin against the associated synchronisation rate for a DSL line.

FIG. 5 shows a graph 500, a box plot, showing the downstream synchronisation rate on the x-axis 504, and the downstream SNR margin whilst synched at that rate on the y-axis 502. The data shown is from a number of days, with measurements taken every 60 seconds. For example, the data points at 506 show a cluster of measurements having a downstream synchronisation rate of 3.84 Mb/s, and with a SNR margin ranging from approximately 5 to 11 dB. The boxed area around 6 dB to 8 dB represents a large collection of data points, and thus it can be seen that most of the measurements recorded at this synchronisation rate have a SNR margin between 6 dB and 8 dB.

Note, the graph 500 is actually a "box and whisker plot", with the box representing the 25$^{th}$ to 75$^{th}$ percentile of the data, with the horizontal line within the box indicating the mean. The lower whisker or line represents data from the 0$^{th}$ to 25$^{th}$ percentile, and the upper whisker the 75$^{th}$ to 100$^{th}$ percentile. Outlying data points are represented as circles.

Turning back to FIG. 2, in step 206, the data illustrated in FIG. 5 is used to determine an optimum synchronisation rate by the line optimisation unit 118. The optimum synchronisation rate is the synchronisation rate at which the line does not lose synchronisation. This is done by examining historical data from the line, and using the minimum stable SNR margin determined in step 202.

By examining the chart 500 in FIG. 5, the highest synchronisation rate for the line where there are no measurements with an SNR margin below the determined minimum stable SNR margin is identified. In this example, the minimum stable SNR margin is 3 dB, which is illustrated by the dashed line 508. The measurements 510 which correspond to a synchronisation rate of 4.608 Mb/s, whilst this has a main cluster of data points having a SNR margin from just under 6 dB to 8 dB, there are also a number of data points falling under the 3 dB mark—the minimum stable SNR margin. Thus, the corresponding synchronisation rate cannot be considered to be an entirely stable rate, as there are data points with an SNR margin that are under the minimum SNR margin, which are likely to lose synchronisation.

However, the measurements 512 corresponding to the synchronisation rate of 4.544 MB/s do not have any measurements for the SNR margin below the minimum stable SNR margin. This is the maximum synchronisation rate where the line is considered to be stable and the condition satisfied, and thus the synchronisation rate that we set the optimum synchronisation rate to. The optimum synchronisation rate in this example is thus set to 4.544 MB/s.

In step 208, the line optimisation unit 118 monitors the current line synchronisation rate and SNR margin, and forces a line resynchronisation when certain conditions are met in order to optimise the line synchronisation rate. If the current synchronisation rate is less than the optimum synchronisation rate, and if the current SNR margin is greater than the target SNR margin plus a predetermined margin, then the line optimisation unit 118 forces the line to resynchronise. The predetermined margin is chosen as the value that provides an increase in synchronisation rate without being overly sensitive to small changes in background noise. From experiments, a predetermined margin of 0.5 dB has been found to work well, though any value from 0.4 dB to 0.6 dB would work as well. Using a higher value would increase the resulting synchronisation rate, but also increase the risk of overshooting the optimum synchronisation rate.

Here, the optimum synchronisation rate is 4.544 Mb/s and the target SNR margin is 9 dB. The predetermined margin is set to 0.5 dB.

Figure 6:
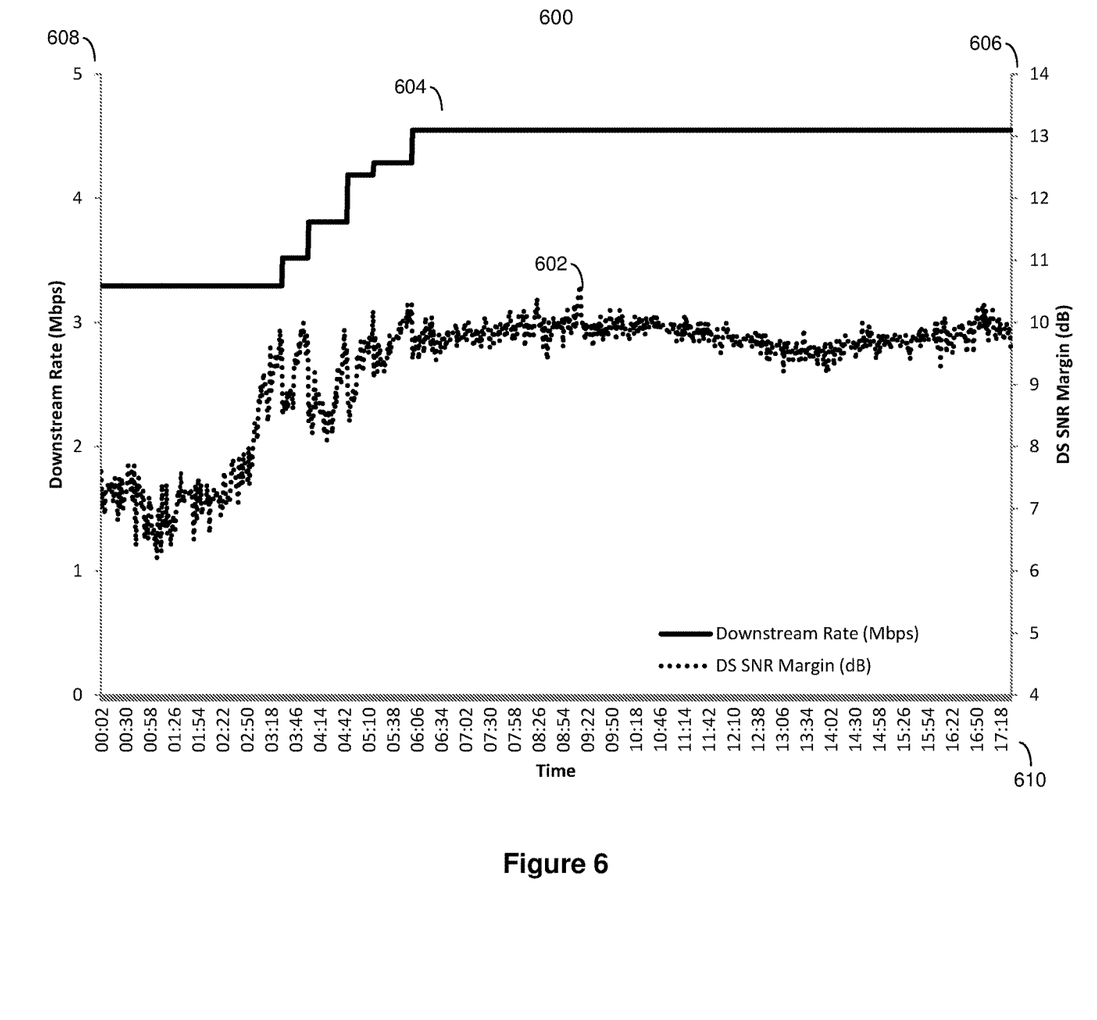
FIG. 6 is a graph illustrating the SNR margin and associated synchronisation rate plotted over a period of time for a DSL where an example of the invention has been applied.

FIG. 6 is a graph 600 illustrating the SNR margin 602 and associated synchronisation rate 604 for a line where the present optimisation method has been applied. The synchronisation rate 604 is shown by the solid line and measured in Mb/s on the left-hand y-axis 408, and the SNR margin 602 is shown by the dotted plot measured in dB on the right-hand y-axis 606. Time shown on the x-axis 610.

Initially, starting at 00:00 hours, the synchronisation rate is at 3.3 Mb/s, which is less than the optimum synchronisation rate of 4.544 Mb/s. Thus, the first condition is satisfied. Initially the SNR margin is not greater than the target SNR margin plus the predetermined margin (9 dB+0.5 dB=9.5 dB). Initially, the SNR margin is around the 7 dB mark. However, at around 03:00 hours, the SNR margin starts to increase, with the current synchronisation rate (at 3.3 Mb/s) still below the optimum synchronisation rate. At around 03:40, the SNR margin increases to above the 9.5 dB mark i.e. greater than target SNR margin+predetermined margin. At this point, the line optimisation unit 118 forces the line to resynchronise, which is done using a control manager in the CPE. The resynchronisation is just to the line, and there is no need to reboot the CPE, so the time taken is in the order of 10-15 seconds. After the line has resynchronised, the graph 600 shows that the line synchronisation rate has increased to 3.5 Mb/s.

Step 208 is repeated following a delay 210, with the line being monitored continuously and resynchronised again if the criteria are satisfied. The delay, 15 minutes here, is introduced to reduce the processing load on the CPE and also minimise the potential impact on the customer as a result of the line being out of service during resynchronisations. This delay can be adjusted to some other period less than or greater than the 15 minutes set here.

Turning back to step 208 after the 15 minute delay, the synchronisation rate is 3.5 Mb/s, which is less than the optimum line synchronisation rate of 4.544 Mb/s. Once the SNR margin goes above the target SNR margin+the predetermined margin (9.5 dB), the line optimisation unit 118 forces the line to resynchronise again. In this example, this happens just before 04:00. After the line has resynchronised, the line synchronisation rate has increased to 3.8 Mb/s.

The process of monitoring and resynchronising in step 208 is repeated continuously, with a delay of 15 minutes in step 210 (which in practice is longer if the test conditions in step 208 are not met), until the synchronisation rate reaches or exceeds the optimum synchronisation rate.

Here, 3 more line synchronisations take place, around 04:40, 05:05 and 05:45. The last synchronisation at 05:45 takes the line synchronisation rate up to 4.55 Mb/s, which is greater than the optimum synchronisation rate of 4.54 Mb/s. As such, the line is not resynchronised again based on the data shown in this graph 600. The line synchronisation unit 118 will continue to monitor the line, and if at some later time, the conditions in step 208 are met (a drop in line synchronisation rate will first be required), then the line will be resynchronised again to attempt to bring the synchronisation rate to the optimum rate.

By using this method, a line's optimum, stable, synchronisation rate is determined, and line can be managed by synchronisations to bring the actual rate towards this optimum rate. Without this method, a standard DSL line might take a long time to recover a low synchronisation rate to a value near the optimum rate.

Step 208 of monitoring and performing a resynchronisation can be delayed until the line is inactive, to avoid interrupting the service experienced by the customer. For example, the a resynchronisation can be delayed until there has been a predetermined period, say 10 minutes, of inactivity on the line.

Whilst the above example has been described with reference to the line optimising unit 118 at the customer's premises 102, the same method is equally applicable to the line optimising unit 114 at the exchange 104 instead.

Exemplary embodiments of the invention are realised, at least in part, by executable computer program code which may be embodied in an application program data. When such computer program code is loaded into the memory of the processor in the line optimising unit 118, it provides a computer program code structure which is capable of performing at least part of the methods in accordance with the above described exemplary embodiments of the invention.

A person skilled in the art will appreciate that the computer program structure referred can correspond to the flow chart shown in FIG. 6, where each step of the flow chart can correspond to at least one line of computer program code and that such, in combination with the processor in the line optimising unit 118, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing a digital subscriber line in a network, comprising:
   a) determining a minimum SNR margin, wherein the minimum SNR margin is the SNR margin of the digital subscriber line below which the digital subscriber line loses synchronisation;
   b) monitoring the synchronisation rate and respective SNR margin following each of a plurality of synchronisations on the digital subscriber line, and estimating an optimum synchronisation rate as the synchronisation rate where all the respective SNR margin or margins are greater than the minimum SNR margin;
   c) monitoring the SNR margin and synchronisation rate of the digital subscriber line; and
      i. initiating synchronisation of the digital subscriber line when both the SNR margin is a predetermined amount over a target SNR margin for the digital subscriber line, and the synchronisation rate is less than the optimum synchronisation rate;
      ii. repeating the initiating step until the synchronisation rate after synchronisation reaches the optimum synchronisation rate; wherein
      the minimum SNR margin is the SNR margin of the digital subscriber line just before a resynchronisation of the digital subscriber line.

2. A method according to claim 1, wherein the target SNR margin is obtained from the network.

3. A method according to claim 1, wherein the target SNR margin is determined by analysis of the SNR margin of the digital subscriber line over a period of time, and identifying the target SNR margin as the SNR margin of the digital subscriber line immediately after a successful resynchronisation.

4. A method according to claim 1, wherein the digital subscriber line connects a digital subscriber line access multiplexer and a customer premises equipment, and the synchronisation rates are downstream synchronisation rates from the digital subscriber line access multiplexer to the customer premises equipment.

5. A line optimisation unit for managing a digital subscriber line in a network, adapted in use to:
   a) determine a minimum SNR margin, wherein the minimum SNR margin is the SNR margin of the digital subscriber line below which the digital subscriber line loses synchronisation;
   b) monitor the synchronisation rate and respective SNR margin following each of a plurality of synchronisations on the digital subscriber line, and estimate an optimum synchronisation rate as the synchronisation rate where all the respective SNR margin or margins are greater than the minimum SNR margin;
   c) monitor the SNR margin and synchronisation rate of the digital subscriber line; and
      i. initiate synchronisation of the digital subscriber line when both the SNR margin is a predetermined amount over a target SNR margin for the digital subscriber line, and the synchronisation rate is less than the optimum synchronisation rate;
      ii. repeat the initiation step until the synchronisation rate after synchronisation reaches the optimum synchronisation rate; wherein
      the minimum SNR margin is the SNR margin of the digital subscriber line just before a resynchronisation of the digital subscriber line.

6. A method of managing a digital subscriber line in a network, comprising:
   a) determining a minimum SNR margin, wherein the minimum SNR margin is the SNR margin of the digital subscriber line below which the digital subscriber line loses synchronisation;
   b) monitoring the synchronisation rate and respective SNR margin following each of a plurality of synchronisations on the digital subscriber line, and estimating an optimum synchronisation rate as the synchronisation rate where all the respective SNR margin or margins are greater than the minimum SNR margin;
   c) monitoring the SNR margin and synchronisation rate of the digital subscriber line; and
      i. initiating synchronisation of the digital subscriber line when both the SNR margin is a predetermined amount over a target SNR margin for the digital subscriber line, and the synchronisation rate is less than the optimum synchronisation rate;
      ii. repeating the initiating step until the synchronisation rate after synchronisation reaches the optimum synchronisation rate,
      wherein the target SNR margin is determined by analysis of the SNR margin of the digital subscriber line over a period of time, and identifying the target SNR margin as the SNR margin of the digital subscriber line immediately after a successful resynchronisation.

* * * * *